United States Patent

Doetsch et al.

[11] 4,035,745
[45] July 12, 1977

[54] CIRCUIT FOR THE PRODUCTION OF AN OPEN ALTERNATING MAGNETIC FIELD

[75] Inventors: Hans-Peter Doetsch, Altdrossenfeld uber Bayreuth; Klaus Thiele, Oberailsfeld uber Bayreuth, both of Germany

[73] Assignee: Sachs-Systemtechnik GmbH, Schweinfurt, Germany

[21] Appl. No.: 686,258

[22] Filed: May 13, 1976

[51] Int. Cl.² .................................. H03B 5/12
[52] U.S. Cl. .............................. 331/114; 330/15; 331/60; 331/168
[58] Field of Search ............ 331/114, 168, 159, 61, 331/60; 330/15, 118

[56] References Cited

U.S. PATENT DOCUMENTS 3,134,948  5/1964  Wilting .......................... 331/114

Primary Examiner—John Kominski
Attorney, Agent, or Firm—Frank L. Durr; Orville N. Greene

[57] ABSTRACT

In an induction energy transfer device comprising a static power conversion circuit for producing an alternating magnetic field of ultrasonic frequency of the type wherein the static power conversion circuit includes a parallel resonant circuit which comprises a coil which also couples power across an air gap, an improvement in efficiency and power transfer is obtained by including at least two such parallel resonant circuits in the power conversion circuit, one of which resonant circuits is tuned to the third harmonic of said fundamental frequency.

10 Claims, 14 Drawing Figures

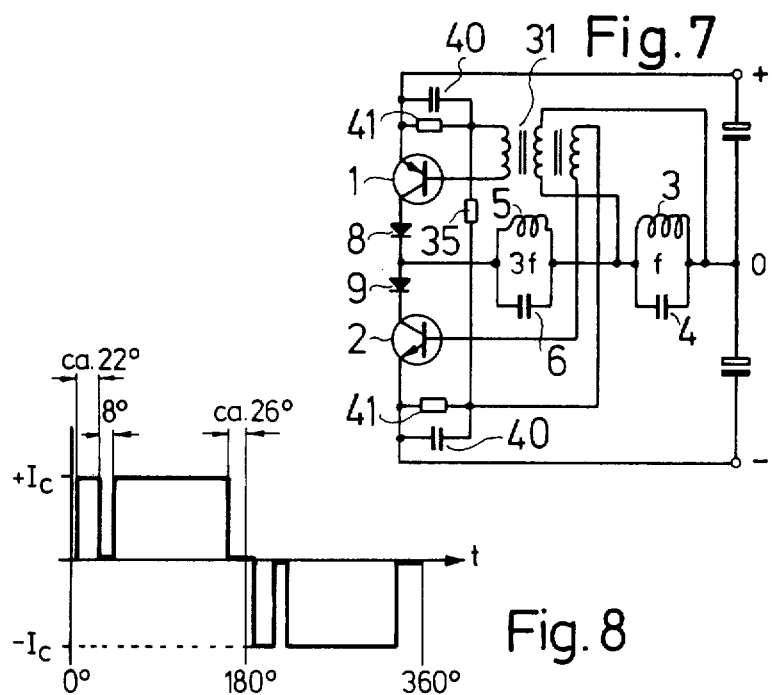
Fig. 7
Fig. 8
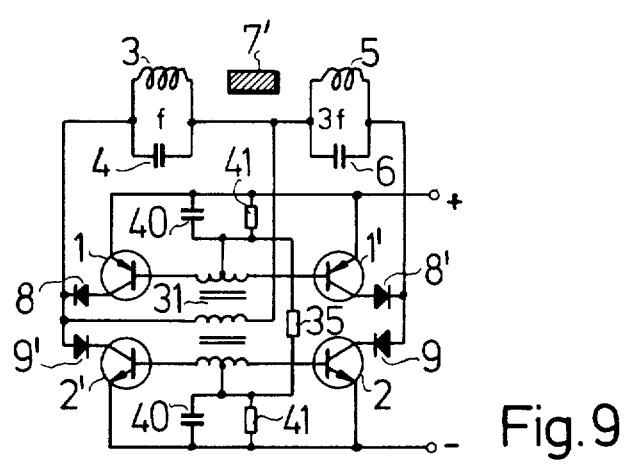
Fig. 9

CIRCUIT FOR THE PRODUCTION OF AN OPEN ALTERNATING MAGNETIC FIELD

The invention concerns the circuit of a static DC-AC converter for the production of an open magnetic field by means of a coreless induction coil. This kind of open magnetic field can serve for the inductive transmission of electrical energy from the circuit-containing primary apparatus over a suitably spatial distance to a matching equipped or developed secondary apparatus, which is brought into the range of this open magnetic field. The manner, and above all the energy exchange and efficiency of the DC-AC converter are dependent upon the frequency or wave form of the electric current and the accompanying voltage forms for producing the open alternating magnetic field.

This invention is accordingly based on the problem, starting from the known transistor circuit converter, the develop this further so that they have in connection with ohmic load, high economical efficiency as well as high and satisfactory energy exchange possibilities. Obviously, this should be attained with the least possible technical circuit expenditure.

With respect to the known transistor circuit converters mentioned, high energy conversion is attained with low transistor losses only when collector alternating current and collector alternating voltage develop timely nearly rectangularly in phase opposition. Here, an efficiency of about 85% has been attainable. However, with an inductive or capacitive consuming load, that is one which is not free of phase shifting, just as with a resonant circuit load, the efficiency decreases considerably.

Further to be considered is that even then when the secondary device of the consumer is of a purely ohmic nature, as a result of the inductive coupling on to the open primary coil, a corresponding stray inductivity appears, which means that there is a corresponding inductive load for the converter.

It has become known with induction ovens that it is possible to compensate for such an inductive component of the primary coils by means of connectable and disconnectable parallel condensers, so that according to circumstances to the to-be-excited thing, a favorable phase-pure load for the generator frequency can be established. To the generator head is thus formed a damped resonant circuit with a sine-like voltage curve, thus a sine-load. However, a pure sine-load is only obtainable at the resonant frequency so that each time when the electric properties of the consumer device functioning to head the goods changes, the resonant frequency and thereby the sine-load must be reestablished through afterturning or corresponding change in the generator frequency.

Since, in general, ferromagnetic materials in a magnetic field operated to reduce the frequency of the inductance coil in comparison to metallic conductors of nonferromagnetic materials which increase the frequency, cooking pots with a combination of iron and copper layers have been suggested (See U.S. Pat. No. 3,777,094). Such pots are less dependent on the varying coupling conditions and with steady generator frequency provide a more uniform sine-load at least to some extent.

It should be noted however, that with converters with sine-loads, a theoretically highest efficiency of 64%, with rectangular current control or with half wave sine control, the highest efficiency of 77% can be attained. With periodic current impulses, which are very short compared with a sine half-wave, a higher efficiency can indeed, in some circumstances, be attained. With this it follows, however, that a strong diminishing of energy exchange occurs whereby the transistor-current productiveness will turn out poorly so that it makes little economic sense to work with that kind of short current impulse. In other respects, the aforesaid mentioned theoretically obtainable limit-efficiency can be obtained practically only approximately with high voltage transistors because the non-usable collector saturation voltage remains insignificantly small in comparison with the operation voltage.

Also known are the so-called transistor stepped voltage converters by which the collector current of a whole series of transistors can be connected through a cycle-controlled number of rings stepwise ascending and descending changeably on the tapping of a ferromagnetic closed output transformer. This clumsily produces approximately in step form, a sine-shaped output voltage. Since the existing apparatuses in question must operated in the range of higher sound ultrasonics, or if necessary, still higher frequencies, and the cycle shift frequency must amount to at least 6 times this frequency, again there results a short transistor switch period and therewith poor efficiency.

Finally, for eddy current heating of cooking pots, a primary apparatus has been provided in which a series oscillating circuit of an induction coil and condenser in a type of saw-toothed oscillating circuit will periodically impinge with the help of a thyristor-thyratron and, if necessary, additional parallel diodes. As supply voltage for the generator, an unfiltered d.c. with doubled power line frequency is used here, which is chopped from the parallel connected thyristor in similar high frequency voltage impulse and produces a sine-current in the open magnetic coil. Also, here the efficiency is no higher than the expected 64% More, a not insignificant expense is necessary for additional electronic control means in order to control, at least in some measure, the poor behavoir of thyristor converters with changing eddy current loads.

This invention solves the above outlined problem through a circuit for the production of an open magnetic field, starting from a switching transistor generator with at least two controlled transistors in push-pull and connected to a first resonant circuit, the coil of which simultaneously acts as the open magnetic field producing induction coil, whereby circuit is this first tuned, through a parallel capacitance to the fundamental frequency, is connected in series with a second coil, which through a second parallel capacitance is tuned in resonance with the third overtone, the two coils which belong to the fundamental tone and third overtone resonant tuned circuits being arranged in mutual non-dampening correlation and proportions and finally, means to supply a timely collector current outflow for the production of an approximate rectangular voltage curve through addition of the two existing resonance voltages are provided.

In order to be able to balance the displacement of resonance frequency of both resonant circuits by the changing of the load through the secondary apparatus, there is provided a feedback free of phase shift over an isolated transformer for self-exciting the generators at that frequency which is given through the actual resonance range of the fundamental wave resonant circuit.

In order to guarantee an at least approximate rectangular voltage curve of the sum of voltages of the fundamental and third harmonic waves, the collector current pulse form can show either a trapezoidal or a clipped rectangular form with a middle gap or a shortened rectangular form with a preimpulse. When the collector current impulse is of trapezoidal form, it can again have increasing and decreasing sides at 15° to 20'' based on 180° half wave time of the fundamental frequency.

The self induction and resonance capacitance of the fundamental wave resonant circuit and the third harmonic wave resonant circuit are preferably in the proportions of 3:1 whereby both coils have about the same number of windings and the impedance resistance in the fundamental and third harmonic wave resonant circuits have consumptively, a rating of actual resistance to impedance resistance of greater than two.

Means are also shown which permits, by a suitable timely collector outflow, a summary of the two existing resonance voltages to an approximate square voltage curve which broadens the greatest possible unattenuated yield of power to the coupled secondary apparatus. Also, no fine tuning of the converter circuit of the primary apparatus is required. These are thus the conditions for a high efficiency of transistors and thereby to give good economical utilization.

Further features of the invention and characteristics of the same with attained advantages will be given in the following description thereof with reference to the attached drawings showing different circuit possibilities and forms of coils developed.

FIG. 1 is a schematic showing of an arrangement of fundamental and third harmonic wave circuits in a simple bridge circuit with complementary transistors.

FIG. 2 reproduces an electric wave form chart illustrating operation of the circuit.

Figure 6:
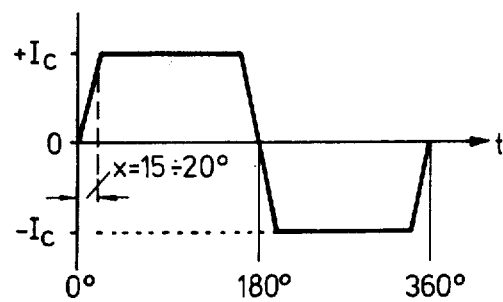

FIG. 6 reproduces the timely curve of a favorable trapezoidal form of collector current.

FIG. 7 shows a circuit with transformer and impulse arrangement for the collector current.

FIG. 8 shows the shortened rectangular current curve and a preimpulse of FIG. 7.

FIG. 9 serves as an example of a double bridge circuit with complementary transistors and feedback transformer.

Figure 10:
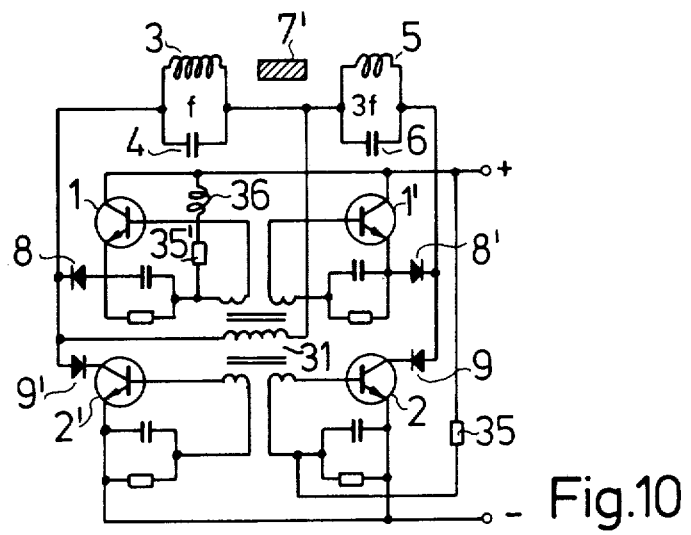

FIG. 10 is a modification of the circuit of FIG. 9 with transistors conducting in the same direction shown.

Figure 11:
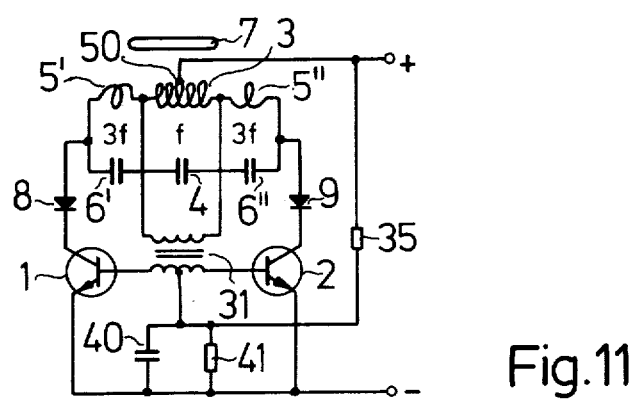

FIG. 11 is a circuit example for a fundamental-and third harmonic-wave circuit in push-pull.

Figure 12:
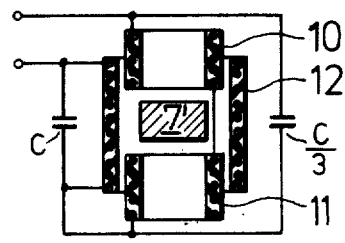

FIG. 12 is a schematic showing of the spatial construction and arrangement of the induction coils for the fundamental and third harmonic waves.

Figure 13:
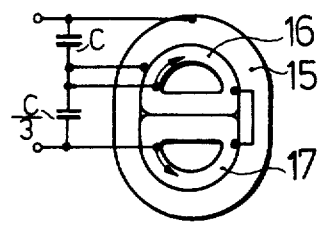

FIG. 13 reproduces a flat coil construction.

Figure 14:
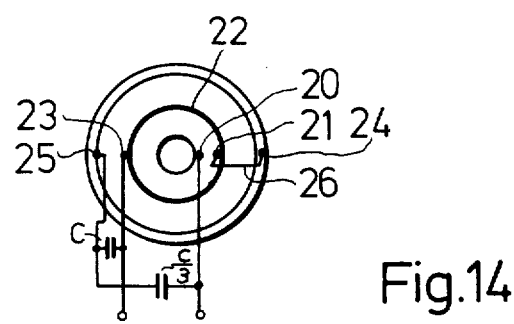

FIG. 14 shows likewise a flat coil construction with circularly arranged coils.

Figure 1:
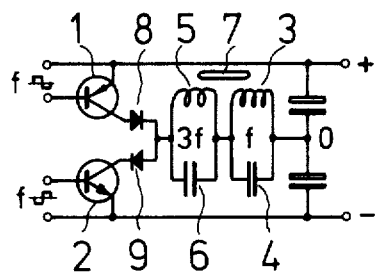

The circuit of FIG. 1 shows two switching transistors 1 and 2, each connected in series to parallel resonant circuits 3,4 for the fundamental frequency and 5,6 for the third harmonic frequency. The coils 3 and 5 of the two resonant circuits together are the induction coils producing the open magnetic field, into which a consumption device, for example, in the form of a closed coil winding 7, will be inserted. The circuit further includes two blocking diodes 8 and 9 on the collectors of transistors 1 and 2. The circuit of FIG. 1 in combination with FIG. 2 serves essentially for the explanation of the invention, practical circuits are shown in more detail in FIGS. 9–11.

The rectangular-like summation voltage obtained by the circuits of the invention is especially advantageous. The energy portions of frequency $f$ and $3f$ which are included in timely rectangular controlled collector current $+I_c$ and $-I_c$ of the switching transistors 1 and 2 will be taken up through the parallel resonant circuits 3,4 and 5,6 on the resonant circuit coils 3 and 5 and be transferred by inductive coupling through the secondary apparatus 7 to the load.

The maximum safe voltage limit on the complimentary transistors between the operating direct current, $+U_−$ or $-U_−$ less the collector emitter saturation voltage, $U_{sat}$, which is the rectangular-like curve of the collector alternating voltage, U, is very much better to use than a sine-voltage by any comparison. The amplitude of the fundamental wave voltage can amount to up to 1.27 times this d.c. voltage range. An amplitude portion of about 0.43 of the third overtone can be added without exceeding the voltage range. As much can be given also for the rectangular collector current. The product of all currents and their accompanying voltages yields an a.c. output of about 90% of the supplied d.c. energy.

Besides, the collector-emitter voltage on the concerned current-carrying transistor over the greatest time is low. It attains a high peak value only during the short ascending and descending points of the rectangularly-like summation voltages. The sum of all products from the collector current times collector-emitter voltage gives thus, over the total time of a period, a very low collector loss energy $M_c$. Also, this contributes to the attained high transistor efficiency.

This further signifies complete collector voltage $I_c$ during a half-wave and extensive use of the operation voltage $U_−$ of a large energy exchange. There are, therefor, only proportionately small transistors necessary, which eliminates disadvantageous switch delays at high frequencies which accompany large transistors and contributes to a corresponding efficient performance.

Finally, the arrangement of fundamental and third harmonic wave yields, by weakening the user coupling, an especially favorable regulation behavior of the generators. The summation voltage increases with the load resistance and exceeds with its humps the collector saturation voltage, $U_{sat}$, so that the collector current, to begin with, stays away from this time zone. With advancing tuning out of the load down to no-load, the collector current per half wave fades down to only two small serrated edges as impulses for the third harmonic and a weaker middle impulse for the fundamental wave resonant circuit. By that, the voltage hump alone cannot exceed the collector saturation voltage, but also goes considerably beyond the null voltage range. A thus connected polarity reversal of the transistors is prevented by the blocking diodes 8 and 9. Otherwise, the inverse transistor current would exert and undesirable oscillation current dampening. The collector d.c. returns in no-load to a small percentage of the maximum current at full load and serves predominantly to protect the small internal losses of the resonant circuits.

The control of generator transistors at a stable frequency has been unfavorable in practice, because the resonance range of the resonant circuits 3,4 and 5,6 always changes in use, so that the transistors are no more loaded free of phase shift as determined against a fixed frequency and the danger of thermic overloading exists. Through self-excitation of the generators with feed back free of phase shift, this can be prevented. It is excited then always to that frequency which corresponds exactly to the respective resonance range of the oscillating circuits inclusive of that in the load through the secondary apparatus. The circuits of the invention comprise two resonant circuits and can yield self-exciting conditions for both different frequencies when the feedback voltage is obtained from the rectangular collector voltage. In the following illustrated voltages, therefore, the feedback voltage alone is branched off from the fundamental wave resonant circuit or transformed downward by means of a transformer.

Figure 3:
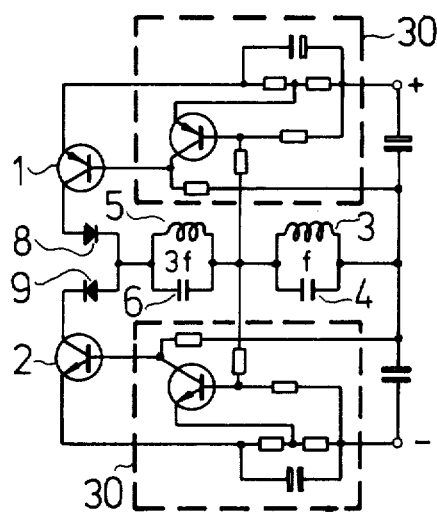
FIG. 3 is the principal circuit of a push-pull transistor generator with phase feedback through phase reversing steps.

The feed back free of phase shift necessitates that the basic a.c. is rotated accurately around 180° of the collector voltage of the fundamental wave resonant circuit. This can ensue by the insertion of a transistor reversing stage 30 between the fundamental resonant circuit and the base of switching transistors 1 and 2 as shown in FIG. 3. With the reproduced push-pull circuit, the transistors require two separate reversing stages 30.

Figure 4:
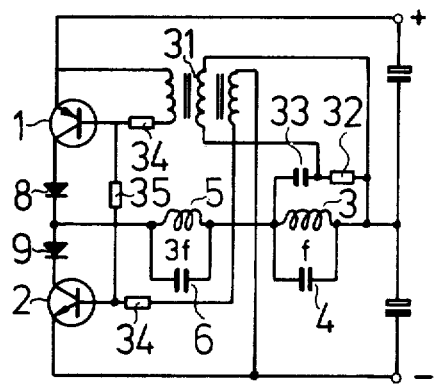
FIG. 4 shows a similar circuit with feedback coupled transformer and phase corrector.

An improved, while economical solution, is reproduced in FIG. 4 where the circuit is equipped with a transformer 31. Here, not so much energy is employed in the compensating and supplementary resistances as in the reversing stages 30 of FIG. 3. The reduction, for the most part of the high fundamental wave voltage from which to the over-excitation of the base of the switch transistors 1 and 2 to an adequate value of about 2 to 3½, stipulates a high reduction ratio of the transformer and places accordingly sufficient control current for disposal at the base side. In order to hold the phase error to the smallest possible value, the transformer 31 is equipped with a closed ferromagnetic core. With a base a.c. voltage over 3 V it is suitable to provide a compensating resistance 34 as current limiter for keeping the transformer load and phase error small. For the adjustment of phase errors, the additional resistance 32 and condenser 35, consisting of a phase correcting member, can, if necessary, be provided on the primary side. A high ohmic resistance 35 serves as an oscillation assistance.

The circuit with the transformer 31 of FIG. 4 offers the advantage of several galvanic separated low voltage windings, e.g. for application to double bridge transistor circuits by which the transistors can be lodged on very different d.c. and a.c. voltage potentials. The transformer can further be brought into play for impulse formation of the collector current as will be shown in suitable examples to follow.

Figure 5:
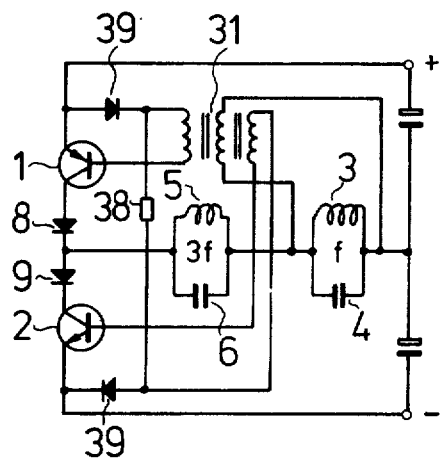
FIG. 5 is a modified circuit similar to FIG. 4 for the production of trapezoidal form collector current.

The given action of the rectangular collector current impulse lasting over the full half wave time of the fundamental frequency and obtained from the summation voltage of fundamental wave and the third harmonic can be further improved if the collector current impulse is given a trapezoidal form. Such a trapezoidal form of collector current permits, with a circuit of FIG. 5, the sine-form base voltage of 1.3 to 1.5 V to be raised around 0.6 to 0.8 V_, against emitter control, whereto a resistance 38 with stabilizing diode 39 serves.

Figure 2:
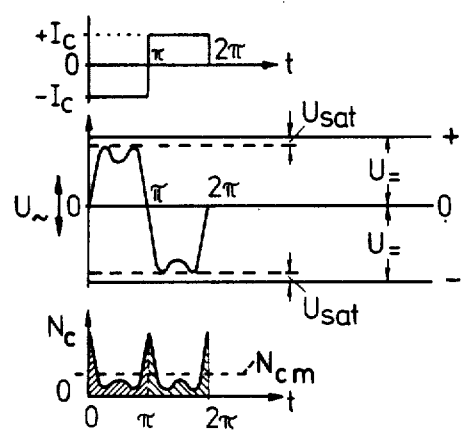

The trapezoidal-form curve obtained in such manner is shown in FIG. 6. With such impulses, the total voltage of the collector current within the critical time interval of the ascending and descending flanks are held smaller than with a rectangular curve. With it, the collector loss peak $N_K$, shown in FIG. 2, is diminished. An optimum is attainable with trapezoidal current with flanks at 15° to 20°. The amplitudes of the fundamental wave and third harmonic are insignificantly small as with rectangular current, however the received d.c. from the generator recedes somewhat (corresponding to the trapezoidal area as opposed to the rectangular area) so that a maximum efficiency of about 95% as the upper range is attainable.

Further investigations have revealed that, in comparison, a pure rectangular impulse, as opposed to a half-wave of 180°, perceptably foreshortened bilaterally, is not as well suited because its third harmonic content shows partly false phase position for the benefit of other harmonics and accordingly does not suffice to establish the desired rectangular-like total voltage on the fundamental and third harmonic resonant circuits. This proves useful is either the circuit for the production of an isolated pre-impulse (a vanguard) shortly after the resultant fundamental wave null passage or for the production of a current gap in the middle of the square impulse is provided.

The desired collector current curve with vanguard can be brought about with little technical expense with a circuit-like FIG. 7 employing a transformer 31 and the parallel circuits including resistance 41 and condenser 40 to the transistors 1 and 2.

In FIG. 8, the collector current curve is shown. Through the isolated vanguard, shortly after the fundamental wave null passage, the third harmonic is vigorously released which will be separated from the subsequently furnished long square impulse for the fundamental effect. The form of this vangard impulse is not critical. A switching operation serration of about 18°-26° duration suffices, whereupon after an additional about 8° intermediate pause, the main square follows. The latter is shortened at the end about 26° opposite a half-wave and there with the clearing-out process results at a time in which the total voltage of the resonant circuit has attained the not repeated value. The vanguard steepens considerably the descending voltage flank of the total voltage and suppresses extensively the occurrence of a disadvantageous collector loss peak in this interval.

By this circuit, the secondary control voltage of the transformer 31 is chosen relatively high in order to attain, with the ascending voltage, that the transistor threshhold range periodically follows closely on the voltage null passage. There base current sets up and relates to the base side, a short build-up action. Through corresponding proportioning, the stray inductivity of the transformer 31 and the sizes of condensers 40 and resistances 41, an approximate aperiodic curve can be attained. A full oscillation of the apparatus will correspond to an order of magnitude of about 10 to 30 times the frequency of the fundamental wave. Further condensers and resistance cause an increasing d.c. base voltage with a constant time constant which overlaps the counteracting controlling a.c. base voltage so that, as desired, permits attaining the blocking of the collector current opposite the fundamental half-wave. The resistance 35 serves again as build-up aid for switching of the generators. With this circuit, the energy conversion of approximately that of the trapezoidal form of collector current is attained. At the same time, a transistor efficiency of practically over 90% is again attained.

FIGS. 9 and 10 show further examples for circuits with a transformer for control with a vanguard and the subsequent shortened collector current following periodically opposite the fundamental half-wave. It is a question of a full bridge circuit with four transistors 1,2 and 1',2' of which in the first half-wave of the fundamental frequency, the first diagonal pair 1,2 switch on simultaneously which in the second half-wave the second diagonal pair 1',2' switch on, alternating with the first pair. Also, here the previously explained basic principle is employed. The circuit of FIG. 9 employs complimentary transistors 1,2 and 1',2'. These have the advantage that the height of the alternating voltage of the resonant circuit advances exclusively on the collectors of the transistors while the base-emitter control sides are situated on null, even if the positive or negative operating d.c. voltage, $V_-$, is like an a.c. voltage. With the circuit of FIG. 10 with transmitters 1,2 and 1',2' with only one conducting direction falls the advantage over the circuit of FIG. 9 when increased demands are placed on the breakdown strength and inferior capacity between the transformer winding particularly at higher generator frequencies. This circuit is, however, available with greater output generators, e.g. over a kilowatt, as long as suitable, high voltage type complementary pairs of transistors are available on the market. The build-up aiding resistance 35' contains additionally a high inductive series choke 36 in order to supress the counter-coupling action of the upper link switching transistor 1 for maintainance of this circuit symmetry.

Finally, the classic push-pull circuit with two switching transistors 1 and 2, as shown in FIG. 11 can be chosen, in cases where transistors for like conductivity tendencies with especially high collector voltage strength are at one's disposal. This circuit permits the current supply directly from a rectifier from a 220 V a.c. line. There, the fundamental wave resonant circuit 3,4 contains a middle tap 50 for the purpose of supplying d.c. voltage. The third harmonic wave resonant circuit comprises two separately timed parts 5' and 6' and 5" and 6" which together are coupled with the fundamental wave. By suitable dimensioning of condensers 40 and resistances 41 as well as the stray inductivity of the transformer 31 vanguard control, according to FIG. 8, is achieved. Trapezoidal form collector current impulses according to FIG. 6 can be developed also if the condenser 40 and resistance 41 be replaced by a diode corresponding to diode 39 or FIG. 5 of through an 0.8 $V_-$ - voltage maintainance.

With the above described circuits taken as a basis, the transistor-rectification principle with fundamental and third harmonic wave circuits, the presumed constant collector current forms with high efficiency and energy conversion are not only theoretically, but also practically attainable and can achieve an exceptional improvement as compared to the proposed and realized possibilities up to this time, especially with respect to the extraordinary simplicity and inexpensiveness of the means as compared to the expense of the known circuits.

Besides the described circuitry and the practical circuit means, the construction of coils 3 and 5 of the resonant circuits play an important roll for efficiency and energy exchange. These coils of fundamental wave circuit and third harmonic wave circuit must have a joint influence on the secondary apparatus and the absorption of each of the two circuits and should carry over in like amounts at corresponding resonance frequencies. With a change of the load through the secondary apparatus, the occurring displacement of the resonance range should not be too great. Above all, the frequency proportion of 1:3 should be observed so that a square total voltage always occurs. In order to hold the frequency shift of the fundamental frequency in the acceptable area of 15-25%, dependent on the secondary apparatus, the proportion $S_b=R_g/R_{bl}$ must be chosen greater than 2, if necessary up to 5, wherein $R_g$ is the collector side basic resistance and $R_{bl}$ is the reactive resistance of the coil. A greater value of $S_b$ favors, with the used collector current impulse form, the inertia properties of a resonant circuit. With it also a similar relative resonant shift on the third harmonic resonant circuit will occur through the load of the secondary apparatus and the coils are so regulated that the self-induction in the fundamental wave resonant circuit is to that in the third harmonic resonant circuit, proportioned in like manner of the accompanying capacitances as 3:1. Moreover, both coils must be constructed with approximately the same number of windings, whereupon the transformation conditions are fulfilled which requires a similar transformer ratio of primary fundamental and of third overtone coils opposite the secondary load. There is obtained by this structure, that the third harmonic coil will be so diminished spatially with its coil field or through its form factor that it shows with a similar number of windings, the required one-third of the self-induction of the fundamental wave set forth above.

Finally, the coils and fundamental wave- and third harmonic resonant circuits are so arranged that the circuits do not mutually dampen, in the simplest case the magnetic fields are at right angles. An exampled arrangement is shown in FIG. 12 where the coils are arranged concentric to one another. This coil arrangement produces on the secondary part, e.g. an object 7' to be heated, an axial and a radial field. In addition to this, one of the coils, advantageously that of the third harmonic resonant circuit, is divided into two parts with contra-rotating current-carrying windings 10,11 so that these together are decoupled against the fundamental wave circuit coil 12. The dimensioning is in accordance with the above given directions. As also shown, the fundamental wave coil 12 is associated with the capacitance C while the third harmonic coil is coordinated with the capacitance C/3.

In FIG. 13, a single layer flat coil is shown as it can be applied advantageously for the eddy current heating of a suitably formed secondary. The oval fundamental wave coil 15 encircles two similar contra-rotating current carrying harmonic windings 16 and 17 of semi-circular form. The electrical characteristics are obviously regulated by the rules discussed above.

FIG. 14 also shows a flat coil whose windings now continue in circular form all in the same winding direction. Such a flat coil is suited, therefore, for the manufacture of a normally wound device. The winding begins with the inner part of the harmonic coil with terminals 20,21. There follows an insulating material support 22. Then comes the fundamental wave coil with the terminals 23,24. The coils are connected with a wire connector 26 between terminals 21 and 24, so that the harmonic wave coil part receives easy flowing current and are magnetically decoupled opposed to the fundamental wave coil. At the same time, both coils are constructed so as to have with their appertaining resonant circuit condensers C and C/3, the resonant circuit series connections.

These flat coils are suited as well for eddy current heating in a secondary apparatus situated at a suitable distance, as well as for contactless and contact safe electric energy transmission to a suitable induction coil of a current reproducing secondary apparatus. Such an induction coil will be arranged e.g. closely facing a primary flat coil as in FIG. 14 or may be of annular structure. When its average diameter amounts to about 63% of the primary coil nest-outer diameter an optimum of proportions of winding voltage to stray inductance results and thus a favorable power coupling. If the second coil has the like structure and like wiring as the primary coil nest, then this brings about an especially high current consumption with square like input voltage as a result of inferior scattering effect.

The special construction of the primary coils which are really parts of the resonant circuit and which serve for the production of the open magnetic field, contribute decisively for the improvement of efficiency and power transmission of the circuits of the invention.

I claim:

1. In a circuit for the production of an open magnetic field of the type comprising a generator with at least two transistors connected in push-pull, each transistor having base, emitter and collector terminals, the output of said generator being connected to resonant circuits having coils which simultaneously act as the induction coil of the open magnetic field, the improvement comprising a first resonant circuit having a coil tuned to a fundamental frequency by means of a parallel capacitance and a second resonant circuit connected in series with the first resonant circuit and having a coil which is tuned to the third harmonic of the fundamental frequency by means of a second parallel capacitance, whereby the two coils are constructed and arranged in such a manner that the fundamental frequency tuned resonant circuit and the third harmonic wave tuned resonant circuit are not mutually attenuating and additional means for supplying a suitably square voltage wave obtained through addition of the two resonance voltages produced, in suitable time relation to the collector current terminals of said generator.

2. A circuit as claimed in claim 1 wherein the additional means for supplying the substantially square voltage wave to the generator comprises feed back means including a separate transformer for self-regulation of the generator at the required frequency.

3. The circuit as claimed in claim 1 wherein the substantially square voltage wave has a trapezoidal form.

4. The circuit as claimed in claim 3, wherein the trapezoidal wave has ascending and descending flanks of about 15° to 20° based on the 180° half wave time.

5. The circuits as claimed in claim 1 wherein the substantially square voltage wave comprises a preimpulse and a foreshortened square wave.

6. The circuit as claimed in claim 1 wherein the substantially square wave has the shape of a foreshortened square wave with a central gap.

7. The circuit as claimed in claim 1 wherein the self-induction and resonance capaciity of the fundamental resonant circuit and the third harmonic resonant circuit respectively are in the proportions of 3:1 wherein both coils have approximately the same number of windings and wherein the impedance resistances in the fundamental resonant circuit and in the third harmonic resonant circuit have a proportion of effective resistance to impedance resistance of more than 2.

8. The circuit as claimed in claim 1 wherein the coils of the two resonant circuits which simultaneously serve as coils for the resonant circuits for the fundamental and third harmonic waves and for creating the magnetic field, are arranged concentric to one another, said coil for the third harmonic wave being constructed in two similar parts with counter rotating, current carrying windings.

9. The circuit as claimed in claim 1 wherein the coils of the fundamental wave resonant circuit and the third harmonic resonant circuit are constructed as flat coils, with the coil of the fundamental wave resonant circuit being oval shaped, and the coil of the third harmonic resonant circuit comprising two parts, each in the form of a semicircle, the two parts having counter rotating, current carrying windings.

10. The circuit as claimed in claim 1 wherein the coils of the fundamental resonant circuit and the third harmonic resonant circuit are constructed as flat coils, all wound in the same direction to an annular configuration, said third harmonic winding occupying the center part of the combination and the fundamental winding being concentrically wound about the outer part of the harmonic winding.

* * * * *